United States Patent [19]

Hosaka et al.

[11] 4,338,682
[45] Jul. 6, 1982

[54] TRACKING SERVO SYSTEM OF VIDEO DISC PLAYER

[76] Inventors: Toshihiko Hosaka; Toru Akiyama, both c/o Universal Pioneer Tokorozawa Plant, 2610, Hanazono 4-chome, Tokorozawa-City, Saitama Prefecture, Japan

[21] Appl. No.: 196,143

[22] Filed: Oct. 10, 1980

[30] Foreign Application Priority Data

Oct. 16, 1979 [JP] Japan .................. 54-133697

[51] Int. Cl.³ .................. G11B 7/00; G11B 21/10
[52] U.S. Cl. .................. 369/44; 369/46; 250/202; 360/77
[58] Field of Search ......... 369/44, 43, 46, 124; 360/77; 250/202, 201; 358/128.5; 318/596, 594, 640, 576, 577

[56] References Cited

U.S. PATENT DOCUMENTS

| | | | |
|---|---|---|---|
| 4,057,832 | 11/1977 | Kappert | 360/10 |
| 4,138,663 | 2/1979 | Lehearean | 369/44 |
| 4,234,837 | 11/1980 | Winslow | 360/77 |
| 4,239,942 | 12/1980 | Van Alem | 360/77 |
| 4,268,745 | 5/1981 | Okara | 369/44 |

OTHER PUBLICATIONS

*The Linear Circuits Data Book*, pp. 451-457 ©1978, Texas Instruments Inc.
*The Bipolar Digital Integrated Circuits Data Book*, pp. I 6-76, I 6-77, ©1976, Texax Instruments, Inc.

*Primary Examiner*—Bernard Konick
*Assistant Examiner*—Alan Faber
*Attorney, Agent, or Firm*—Michael J. Striker

[57] ABSTRACT

A tracking servo system of a video disc player, in which the switch provided in the servo loop of the system is closed and accordingly the servo system is locked in when the level of the reproducing signal read out from the video disc is at its peak or close to the peak and concurrently the amount of error between the scanning spot and the track to be scanned is of a minimum value.

8 Claims, 11 Drawing Figures

TRACKING SERVO SYSTEM OF VIDEO DISC PLAYER

FIELD OF THE INVENTION

The present invention relates in general to an apparatus for reading and reproducing the information recorded on a video disc of, for example, the type in which the information recorded therein is to be read out in an optical fashion. Particularly, the present invention relates to a tracking servo system for use in a video-disc reading and reproducing apparatus. In the following description, an optically-scanned video-disc information reading and reproducing apparatus will be also referred to simply as an optical video disc player.

BACKGROUND OF THE INVENTION

In a video disc presently in use for a video disc player, video and audio information is stored in a multiplex form consisting of a video carrier which is frequency modulated (FM) with a standard NTSC (National Television System Committee of U.S.A.) video signal and two-channel audio carriers each of which is frequency modulated with an audio signal. The video signal carrier is higher in frequency than the audio carriers and is superposed in the form of pulsewidth modulation on the audio signal carriers in the multiplex signal recorded on the video disc. As is well known in the art, the video disc is sometimes used for recording only the audio signal information in PCM (pulse code modulation) mode and such video disc as to carry thereon only the audio signal information is in some cases called as DAD (Digital Audio Disc) because the audio information recorded in digital form.

The technical term "video disc" covers in this specification not only usual video disc carrying both video and audio information but also such video disc carrying thereon only the audio signal information in digital form.

In the case of a video disc of the optically scanned type, the multiplex signal thus consisting of the frequency modulated video and audio carriers superposed on each other is stored as a series of depressed areas or "pits" formed in each or one information-carrying face of the video disc and arranged in a spiral track or a number of concentric tracks about the center axis of the disc. The video and audio information thus stored in read out by optically scanning the individual pits along the spiral track or each of the concentric tracks by means of a beam of laser light and thereby detecting the lengths of and spacings between the scanned pits. During playback of such a video disc, the disc is driven for rotation about the center axis thereof usually at a fixed velocity and the beam of the laser light is displaced radially of the disc by a tracking device, or pick-up unit, forming part of the video disc player. The laser beam directed to the target track is reflected from the information-carrying face of the video disc or passed through the disc. The beam of light thus reflected from or passed through the video disc is converted into an electric reproducing signal by means of a photoelectric transducer unit mounted on the pick-up unit for further conversion into video and audio signals.

The laser beam to read out the information recorded on an optically scanned video disc is moved radially of an information-carrying face of the disc by the aid of the tracking servo system under the control of a tracking error signal indicative of the location of the scanning spot of light with respect to the target track on the disc. To control the tracking servo system reliably on the basis of such an error signal, it is important that the servo loop of the tracking servo system be closed when or after the scanning spot of light is moved close to the target track on the video disc. If the servo loop is closed and the servo system is locked in before the scanning spot of light is moved close to the target track, it may happen that the tracking mirror forming part of the optical pick-up system and operative to deflect the scanning beam in a radial direction of the video disc is abruptly initiated into motion to reach the target track and thus overshoots the target track. In an extreme case, the tracking mirror may be caused to oscillate and disable the tracking servo system from being locked in. Such an event may be caused not only during scanning of a video disc but generally when the servo loop of the tracking servo system is to be closed from an open condition.

While the present invention is useful for overcoming the various problems which have been encountered in prior-art video disc players of the optically scanning type, essentially similar problems will occur also in other types of video disc players of, for example, the capacitance scanning type. It should therefore be borne in mind that the gists of the present invention are applicable or realized in video disc players in general.

It is, therefore, an important object of the present invention to ptovide a video disc information reading and reproducing apparatus including an improved tracking servo system which can be locked in reliably and in a stable condition when the servo loop of the system is to be closed from an open condition.

SUMMARY OF THE INVENTION

In accordance with the present invention, there is provided a tracking system for displacing a scanning spot or point radially of a video disc being played back in a video disc player, comprising signal level detector means for detecting the signal level of the electric signal read out by the scanning spot from said video disc and producing an output signal variable with the detected signal level, error signal producing means operative to produce a tracking error signal continuously variable in magnitude with an amount of deviation, if any, of the scanning spot from a target track on the video disc and having polarities respectively corresponding to the directions in which the scanning spot is to be moved radially of the video disc, comparing means for comparing the output signal from the signal level detector means with a reference signal having a predetermined level for producing an output signal when the former is higher in level than the latter, control signal producing means responsive to the aforesaid tracking error signal and the output signal from the comparing means and operative to produce a control signal when the tracking error signal has a predetermined level in the presence of the output signal from the comparing means, and switch means provided in the servo loop of the tracking servo system and operative to close the servo loop in response to the control signal delivered from the control signal producing means.

The control signal producing means in the tracking servo system thus constructed and arranged may comprise a comparator circuit operative to compare tracking error signal with a reference signal having a predetermined level and produce an output signal when the former is higher in level than the latter, a differentiator circuit for differentiating the output signal from the comparator circuit with respect to time, and gating means for passing therethrough the output signal from the differentiator circuit in the presence of the output signal from the comparing means for theregy producing the aforesaid control signal from the control signal producing means.

As an alternative, the control signal producing means included in the tracking servo system may comprise first and second comparator circuits concurrently responsive to the tracking error signal and operative to compare the tracking error signal with a reference signal having a predetermined level for producing output signals when the former is respectively higher and lower in level than the latter, a two-position switch shiftable between the first and second comparator circuits, a differentiator circuit having an input terminal selectively connected to the first and second comparator circuits across the two-position switch and operative to differentiate the output signal from selected one of the first and second comparator circuits with respect to time, and gating means for passing therethrough the output signal from the differentiator circuit in the presence of the output signal from the above mentioned comparing means for thereby producing the control signal from the control signal producing means.

When the video disc player is of the optically scanned type using a scanning beam of light, the error signal producing means may comprise means for emitting two index beams of light toward a target track on the video disc for producing two focused spots located in predetermined relationship to the focused spot of the scanning beam incident on the video disc, the relationship being such that the respective areas over which the focused spots of the two index beams incident on the video disc overlap the target track are substantially complementary to each other.

BRIEF DESCRIPTION OF THE DRAWINGS

The features and advantages of a tracking servo system according to the present invention will be more clearly understood from the following description taken in conjunction with the accompanying drawings in which.

DESCRIPTION OF THE PREFERRED EMBODIMENT

Figure 1A:
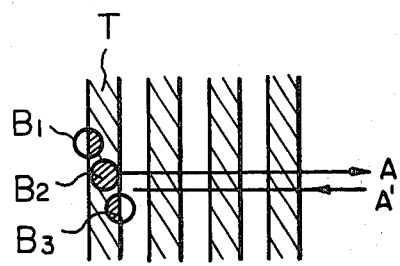
FIG. 1A is a view schematically showing a basic concept in which the location of the scanning spot with respect to a target track of an optically scanned video disc is to be detected by the use of index beams of light for producing a tracking error signal for use in a tracking error system proposed by the present invention for incorporation into an optical video disc player.

In order to produce signals to control the tracking and focus servo systems incorporated in an optical video disc player, two index beams of laser light are radiated onto the information-carrying face of the video disc being scanned by a scanning laser beam. The three beams of laser light are focused at points located in predetermined relationship to each other on the information-carrying face of the video disc being played back. FIG. 1A shows an example of such a relationship among the respective focused spots of these three beams, wherein the focused spots of the index beams are denoted by $B_1$ and $B_2$ and the focused spot of the scanning beam is denoted by $B_3$. In the example herein shown, the three beams are assumed to be directed toward a target track T so that one of the focused spots $B_1$ and $B_2$ of the index beams overlaps the target track T over one half area of the spot and the other focused spot overlaps the target track T over the other half area of the spot when the focused spot $B_3$ of the scanning beam is correctly located on the target track T. When the focused spots $B_1$, $B_2$ and $B_3$ of the index and scanning beams are thus located with respect to the target track T, the signal level of the reproducing signal (Sr) resulting from the light beam reflected from or passed through the focused spot $B_3$ of the scanning beam peaks up. If, furthermore, a tracking error signal is produced through detection of the difference between the levels of the signals produced from the light beams reflected from or passed through the focused spots $B_1$ and $B_2$ of the index beams, the error signal assumes a zero value when the focused spots $B_1$ and $B_2$ are located as illustrated in FIG. 1A since the levels of such signals are substantially equalized under such a condition.

Figure 1B:
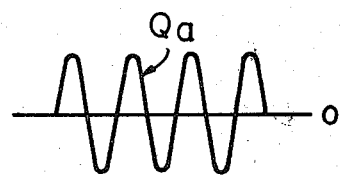
FIG. 1B is a graph showing an example of the waveform of the tracking error signal produced in the tracking servo system provided by the present invention.
Figure 1C:
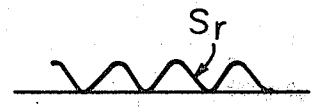
FIG. 1C is a graph showing an example of the waveform of the audio carrier component extracted from the reproducing signal read out from an optically scanned video disc in an apparatus according to the present invention.

If the pick-up unit is then moved radially of the video disc in one direction perpendicalar to the target track T as indicated by an arrow A in FIG. 1A in order to trace another target track apart from the track T, the index and scanning spots $B_1$, $B_2$ and $B_3$ move in the same direction and the level of the tracking error signal will vary sinusoidally as indicated by curve Qa in FIG. 1B as the scanning beam is moved from one of the parallel tracks or track portions to another. The level of the sinusoidal wave Qa varies in proportion to the distance between the center point of the focused spot $B_3$ of the scanning beam and the center line of the target track closest to the focused spot $B_3$. On the other hand, the polarities of the signal indicated by the sinusoidal wave Qa corresponds to the directions in which the focused spot $B_3$ of the scanning beam is moving toward and away from the target track. FIG. 1C shows an example of the waveform of the reproducing signal Sr read out from the target track thus scanned.

In controlling the tracking servo system reliably on the basis of the tracking error signal Qa produced in the above described manner, it is important that the servo loop of the tracking servo system be closed when the focused spot $B_3$ of the scanning beam is moved close to the target track. If the servo loop is closed when the focused spot $B_3$ of the scanning beam is located far ahead of the target track T or, in other words, the tracking error signal Qa is at a relatively high level, the tracking mirror to deflect the scanning beam in a radial direction of the video disc is abruptly initiated into motion attempting to reach the target track T and may overshoot the target track. In an extreme case, the tracking mirror may be caused to oscillate violently and disable the servo system from being locked in. The embodiment of the present invention is intended to provide an improved tracking servo system which can be locked in reliably in a stable condition when the servo loop of the system is to be closed from an open condition.

Figure 2:
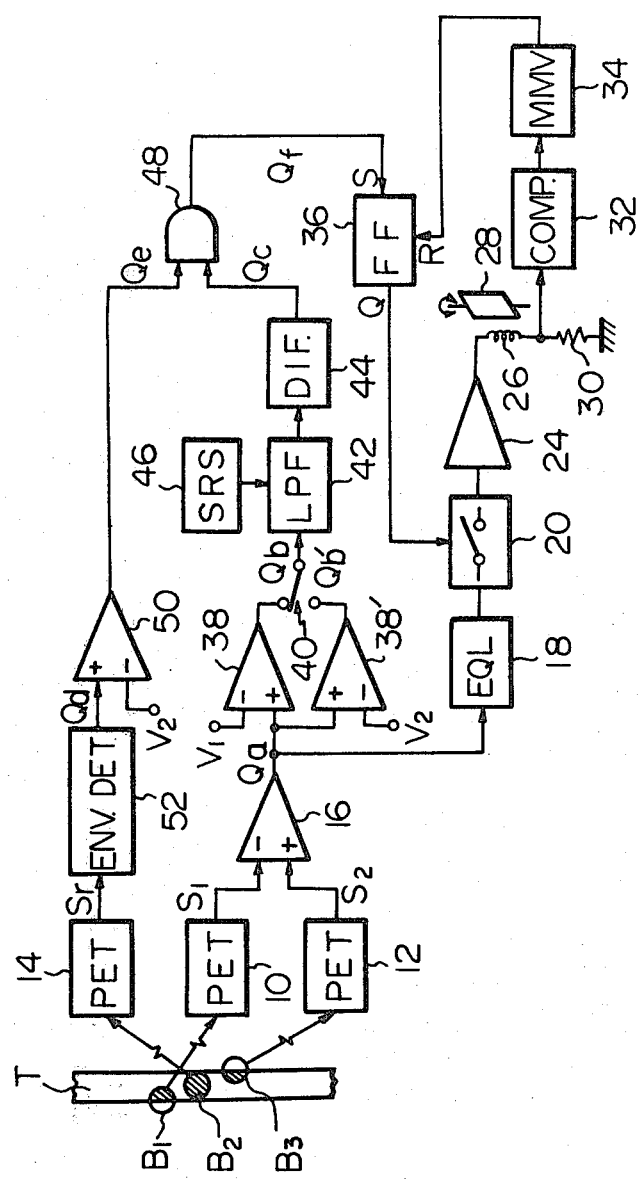
FIG. 2 is a block diagram showing the circuit arrangement of a preferred embodiment of the tracking servo system proposed by the present invention.

Referring to FIG. 2 of the drawings, the servo loop of such an improved servo system is shown comprising first, second and third photoelectric transducer units 10, 12 and 14 each adapted to convert luminous information into a corresponding electric signal. These transducer units 10, 12 and 14 are mounted on a pick-up unit (not shown) which further includes an optical system for delivering therethrough three light beams emitted from light sources to the information-carrying face of the video disc and for relaying the reflected light beam to the transducer units 10, 12 and 14. The first and second transducer units 10 and 12 are responsive to the beams of light reflected from or passed through the focused spots $B_1$ and $B_2$, respectively, of the index laser beams and are operative to produce output signals $S_1$ and $S_2$, respectively. The signal $S_1$ and $S_2$ have signal levels respectively proportional to the areas over which the focused spot $B_1$ and $B_2$ of the index laser beams overlap the target track T on the video disc being played back, as will be understood from the description previously made with reference to FIG. 1A. On the other hand, the third photoelectric transducer unit 14 is adapted to pick up the information read out by the scanning beam incident on the information-carrying face of the video disc. Thus, the third photoelectric transducer unit 14 produces a reproducing signal Sr containing the video and audio information to be reproduced.

Figure 3A:
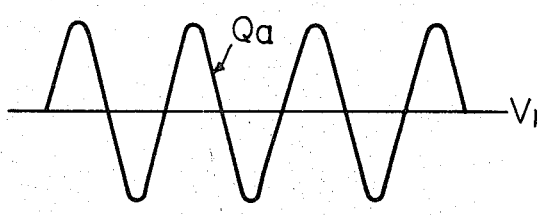
FIGS. 3A to 3G are graphs showing various waveforms appearing in the circuit arrangement shown in FIG. 2.

The output signals $S_1$ and $S_2$ delivered from the first and second photoelectric transducer units 10 and 12 are fed to subtractor means which is shown constituted by a differential amplifier 16 having two input terminals connected to the respective output terminals of the transducer units 10 and 12. The differential amplifier 16 is adapted to process the signals $S_1$ and $S_2$ as, for example, the subtrahend and minuend, respectively, and thereby produce an output signal indicative of the difference between the levels of the signals $S_1$ and $S_2$. The output signal produced by the differential amplifier 16 is, thus, the above mentioned tracking error signal Qa and varies sinusoidally as shown in FIG. 3A as the scanning beam is displaced radially of the information-carrying face of the video disc in a direction indicated by the arrow A in FIG. 1A.

The differential amplifier 16 has an output terminal connected through an equalizer circuit 18 (EQL) and across a switch 20 to an amplifier 24 having an output terminal connected to a driver coil 26 for a tracking mirror 28. The tracking mirror 28 is pivotable about an axis fixed in the pick-up unit. The switch 20 has a control terminal and is closed when the control terminal thereof is supplied with an actuating signal.

The driver coil 26 for the tracking mirror 28 is grounded through a resistor 30. The voltage across the resistor 30 is constantly monitored by suitable monitoring means which is herein shown comprising a series combination of a window comparator 32 and a monostable vibrator 34. The window comparator 32 is adapted to pass therethrough voltages which are higher and lower than predetermined positive and negative limits, respectively, having equal magnitudes. When the absolute value of the voltage across the resistor 30 becomes higher than the absolute value of such limits, the window comparator 32 produces an output signal such as a logic "1" signal and thereby triggers the monostable multivibrator 34. The output terminal of the monostable multivibrator 34 is connected to the reset terminal R of a set-reset flipflop circuit 36. When triggered by the output signal from the window comparator 32, the monostable multivibrator 34 thus produces a singleshot signal and thereby resets the flipflop circuit 36.

Figure 3B:
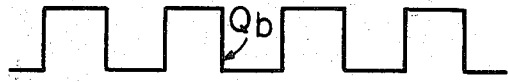

The tracking loop shown in FIG. 2 further comprises control signal producing means which includes first and second comparator circuits 38 and 38' each having two, positive and negative input terminals. The positive input terminal of the first comparator circuit 38 and the negative input terminal of the second comparator circuit 38' are connected jointly to the output terminal of the differential amplifier 16, while the negative input terminal of the first comparator circuit 38 and the positive input terminal of the second comparator circuit 38' are connected to a source or sources of a reference signal having a predetermined voltage $V_1$ as shown. Thus, the first comparator circuit 38 is operative to compare the level of the signal Qa with the predetermined voltage $V_1$ and produce pulse signals Qb when the former is higher than the latter. If, in this instance, the voltage $V_1$ of the reference signal is selected at the level of a ground potential as indicated in FIG. 3A, then the waveform of the pulse signals Qb appearing at the output terminal of the first comparator circuit 38 becomes such that is shown in FIG. 3B. On the other hand, the second comparator circuit 38' is operative to compare the level of the output signal Qa from the differential comparator 16 with the predetermined voltage $V_1$ and produce pulse signals Qb' when the former is lower than the latter.

Figure 3C:
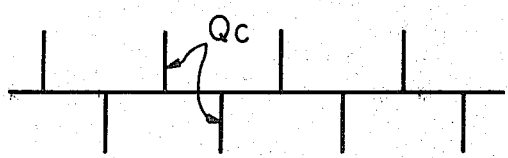

The respective output terminals of the first and second comparator circuits 38 and 38' thus arranged are connected across a two-position switch 40 and through a digital low-pass filter 42 (LPF) to the input terminal of a differentiator circuit 44 (DIF). The two-position switch 40 is controlled to selectively provide connection between the first comparator circuit 38 and the low-pass filter 42 when the pick-up unit as well as the scanning spot is moved in the direction of the arrow A shown in FIG. 1A, or connection between the second comparator circuit 38' and the low-pass filter 42 when the scanning beam is moved in the opposite direction indicated by A' in FIG. 1A. The pulse signals Qb or Qb' delivered respectively from the first or second comparator circuit 38 or 38' and passed through the two-position switch 40 and the low-pass filter 42 is differentiated with respect to time in the differentiator circuit 44. Thus, the differentiator circuit 44 produces impulse signals Qc indicated in FIG. 3C when the two-position switch 40 is in a position providing connection from the first comparator circuit 38 to the low-pass filter 42 as shown in FIG. 2. The digital low-pass filter 42 is provided for the purpose of enabling the tracking servo system to be locked in at low frequencies of the tracking error signal Qa because the servo system might be disabled from being locked in when the tracking error signal Qa occurs at excessively high frequencies. When the scanning rate of the pick-up unit is increased, the cut-off frequency of the low-pass filter 42 is also increased with the increase in the scanning rate. For this purpose, the low-pass filter 42 has a cut-off frequency control terminal connected to a scanning rate shifter 46 (SRS) so that the cut-off frequency of the filter is variable with the scanning rate of the pick-up unit indicated by the scanning rate shifter 46.

The impulse signals Qc delivered from the differentiator circuit 44 are fed to one input terminal of a two-input logic "AND" gate circuit 48. The other input terminal of the "AND" gate circuit 48 is connected to the output terminal of comparing means which is shown constituted by a comparator circuit 50 having positive and negative input terminals. The negative input terminal of the comparator circuit 50 is connected to source of a reference signal having a predetermined voltage $V_2$, while the positive input terminal of the comparator circuit 50 is connected to signal level detector means adapted to detect the signal level of the reproducing signal Sr and to produce an output signal Qd variable with the detected signal level. In the arrangement shown in FIG. 2, such detector means is shown comprising an envelope detector circuit 52 operative to detect the level of the envelope of the frequency modulated reproducing signal Sr or the envelope of the audio carrier component of the reproducing signal Sr and produces as the above mentioned signal Qd a signal variable with the detected level of the envelope. To the positive terminal of the comparator circuit 52 is thus impressed the signal Qd indicative of the level of the envelope of the frequency modulated reproducing signal Sr or the audio carrier component thereof. An example of the waveform of such a signal Qd is indicated in FIG. 3D.

Figure 3D:
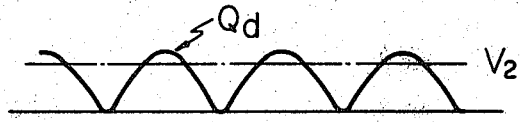
Figure 3E:
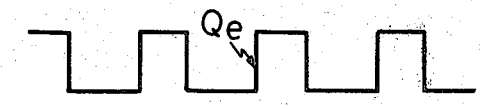
Figure 3F:
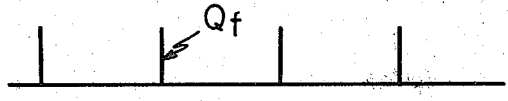

The comparator circuit 50 is adapted to compare the level of the output signal Qd from the envelope detector 52 with the predetermined voltage $V_2$ and produce a series of positive pulse signals Qe when the former is higher than the latter as will be seen from FIGS. 3D and 3E. The pulse signals Qa are fed to one input terminal of the logic "AND" gate circuit 48 so that the impulse signals Qc supplied from the differentiator circuit 44 are selectively passed through the "AND" gate circuit 48 as indicated by Qf in FIG. 3F in the presence of the pulse signals Qe from the comparator circuit 50. The output terminal of the "AND" gate circuit 48 is connected to the set terminal S of the flipflop circuit 36, the output terminal Q of which is connected to the control terminal of the switch 20 of the servo loop.

The leading and trailing edges of the pulse signals Qb supplied from the first comparator circuit 38 correspond to the zero value of the tracking error signal Qa produced when the scanning beam is deflected in the direction of the arrow A in FIG. 1A. More specifically, each of the trailing edges of the pulse signals Qb indicates that the focused spot $B_3$ of the scanning beam is correclty located on each of the parallel tracks portions shown in FIG. 1A while each of the leading edges of the pulse signals Qb indicates that the focused spot $B_3$ of the scanning beam is located centrally between every adjacent two of the parallel tracks or track portions. Supplied with such pulse signals Sb, the differentiator circuit 44 produces alternately positive and negative impulse signals Qc which are positive in response to the trailing edges of the pulse signals Qb and negative in response to the leading edges of the pulse signals Qb.

On the other hand, the pulse signals Qe supplied from the comparator circuit 50 indicate that the frequency modulated reproducing signal Sr or the audio carrier component thereof is at peak levels or close to the peak levels. Such pulse signals Qe are fed as gate signals to the "AND" gate circuit 48 so that only the positive ones of the impulse signals Qc are passed through the "AND" gate circuit 48. Thus, each of the impulse signals Qf delivered from the "AND" gate circuit 48 occurs when the amount of tracking error is minimum and concurrently the level of the reproducing signal Sr or the audio carrier component thereof is at or close to a peak value. The switch 20 is closed at such a timing so that the tracking servo system can be locked in accurately and reliably.

It may be mentioned that the tracking servo system can be locked in not only in the presence of an audio signal in the original reproducing signal Sr but also in the absence of an audio signal in the reproducing signal Sr but also in the absence of an audio signal in the reproducing signal Sr provided the reproducing signal Sr contains video information. This is because of the fact that the reproducing signal Sr containing video information contains an audio carrier although the signal may not contain audio information.

When, on the other hand, the voltage across the resistor 30 connected to the driver coil 26 for the tracking mirror 28 is higher than a predetermined upper limit or lower than a predetermined lower limit which is equal in magnitude to the upper limit, the window comparator 32 triggers the monostable multivibrator 34 and thereby cause the flipflop circuit 36 to be reset. The switch 20 of the servo loop for the tracking mirror 28 is now made open and prevents the tracking mirror 28 from being turned excessively about the axis of rotation thereof. The time constant of the monostable vibrator 34 is thus selected in consideration of the period of time for which the tracking mirror 28 is capable of restoring its proper angular position after the switch 20 is made open.

Figure 3G:
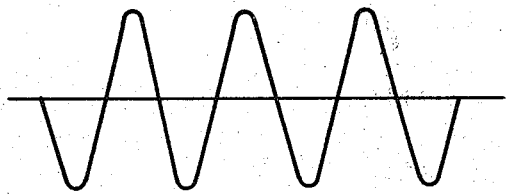

When the scanning beam is deflected to move in a direction indicated by the arrow A' in FIG. 1A with respect to the parallel tracks or track portions on a video disc, the two-position switch 40 is shifted to a position providing connection from the second comparator circuit 38' to the low-pass filter 42 therethrough. Under such a condition, the tracking error signal Qa delivered from the differential amplifier 16 takes a waveform shown in FIG. 3G so that the pulse signals Qb' produced by the second comparator circuit 38' appear in a waveform similar to the waveform of the pulse signals Qb shown in FIG. 3B. The circuit components subsequent to the comparator circuit 38' thus operate similarly to those connected to the first comparator circuit 38.

Although it has been assumed that the servo loop of the embodiment of FIG. 2 is closed during scanning of the tracks on a video disc, the servo loop is controlled in a similar manner then the loop is to be closed during other operational conditions.

What is claimed is:

1. A tracking servo system for a video-disc information reading and reproducing apparatus (wherein the information carried by a video disc is to be scanned by a scanning spot displaced radially of the video disc) which apparatus includes a pick-up unit having a system for producing a scanning spot with respect to a video disc while deflecting the scanning spot radially of said video disc so as to make the scanning spot to trace a target track of the video disc, comprising:

signal level detector means mounted on said pick-up unit, for detecting the signal level of the reproducing signal read out by the scanning spot from said video disc and producing an output signal variable with the detected signal level, error signal producing means operative to produce a tracking error signal continuously variable in magnitude with an amount of deviation, if any, of the scanning spot from (a) said target track (on) of the video disc and having polarities respectively corresponding to the directions in which the scanning spot is to be displaced radially of the video disc, scanning spot deflecting means mounted on said pickup unit for deflecting said scanning spot in response to variations in magnitude of said error signal, comparing means for comparing the output signal from said signal level detector means with reference signal having a predetermined level for producing an output signal when the former is higher in level than the later, control signal producing means responsive to said tracking error signal and said output signal from said comparing means and operative to produce a control signal when said tracking error signal has a predetermined level in the presence of the output signal from the comparing means, and loop closure switch means provided (in the servo loop of said tracking servo system) between said error signal producing means and said scanning spot deflecting means and operative to (close the servo loop) interconnect said error signal producing means and said scanning spot deflecting means in response to (the) said control signal (delivered from said control signal signal producing means) so as to supply said error signal to said scanning spot deflecting means.

2. A tracking servo system as set forth in claim 1, in which said control signal producing means comprises first and second comparator circuits concurrently responsive to said tracking error signal and operative to compare the tracking error signal with a reference signal having a predetermined level close to ground potential for producing output signals when the former is respectively higher and lower in level than the latter, a two-position switch shiftable between said first and second comparator circuits, a differentiator circuit having an input terminal selectively connected to said first and second comparator circuits across said two-position switch and operative to differentiate the output signal from selected one of the first and second comparator circuits with respect to time, and gating means for passing therethrough the output signal from said differentiator circuit in the presence of the output signal from said comparing means for producing said control signal from said control signal producing means.

3. A tracking servo system as set forth in claim 2, in which said control signal producing means further comprises a digital low-pass filter connected between said two-position switch and said differentiator circuit.

4. A tracking servo system as set forth in claim 3, in which said digital low pass filter has a cut-off frequency variable in accordance with a control terminal, and said control signal producing means further comprises control means for varying the cut-off frequency of said low pass filter for producing said control signal in accordance with the rate at which said scanning beam spot is deflected radially of said video disc.

5. A tracking servo system as set forth in claim 1, in which said information reading and reproducing apparatus is of the optically scanning type adapted to scan said video disc by a scanning beam of light and in which said error signal producing means comprises means for emitting two index beams of light toward a target track on said video disc for producing two focused spots located in predetermined relationship to the focused spot of the scanning beam incident on said video disc, said relationship being such that the respective areas over which the focused spots of the index beams incident on the video disc overlap the target track are substantially complimentary to each other.

6. A tracking servo system as set forth in claim 5, in which said error signal producing means further comprise two photoelectric transducer means which are respectively operative to produce output signals continuously variable with said areas, and subtractor means for producing as said tracking error signal an output signal continuously variable with the difference between the respective levels of the output signals from said transducer means.

7. A tracking servo system as set forth in claim 1, further comprising tripping means connected to said switch means and responsive to the signal passed through said switch means, the tripping means being operative to produce an output signal when the absolute value of the level of the signal passed through the switch means is higher than a predetermined value for causing said switch means to open.

8. A tracking servo system as set forth in claim 7, in which said tripping means comprises monitoring means operative to compare the voltage passed through said switch means and produce an output signal when the absolute value of the voltage passed through the switch means is higher than a predetermined value, and resettable memory means connected between said control signal producing means and said switch means and operative to pass the output signal from the control signal producing means to said switch means only in the absence of the output signal from said monitoring means.

* * * * *